(12) United States Patent
Jilani et al.

(10) Patent No.: US 11,817,611 B2
(45) Date of Patent: Nov. 14, 2023

(54) FUEL CELL STACK

(71) Applicants: AUDI AG, Ingolstadt (DE); Volkswagen AG, Wolfsburg (DE)

(72) Inventors: Adel Jilani, Burnaby (CA); Siva Sankar Voosani Krishna, Burnaby (CA)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 406 days.

(21) Appl. No.: 17/254,802

(22) PCT Filed: May 10, 2019

(86) PCT No.: PCT/EP2019/062013
§ 371 (c)(1),
(2) Date: Dec. 21, 2020

(87) PCT Pub. No.: WO2019/242932
PCT Pub. Date: Dec. 26, 2019

(65) Prior Publication Data
US 2021/0265649 A1    Aug. 26, 2021

(30) Foreign Application Priority Data
Jun. 22, 2018  (DE) ..................... 10 2018 210 181.7

(51) Int. Cl.
*H01M 8/248* (2016.01)
*H01M 8/2475* (2016.01)

(52) U.S. Cl.
CPC ......... *H01M 8/248* (2013.01); *H01M 8/2475* (2013.01); *H01M 2250/20* (2013.01)

(58) Field of Classification Search
CPC ............... H01M 8/248; H01M 8/2475; H01M 2250/20; Y02E 60/50; Y02T 90/40
See application file for complete search history.

(56) References Cited

U.S. PATENT DOCUMENTS

| | | | |
|---|---|---|---|
| 6,413,665 B1* | 7/2002 | Blanchet | H01M 8/248 429/511 |
| 2004/0121216 A1* | 6/2004 | Blanchet | H01M 8/248 429/470 |
| 2006/0093890 A1 | 5/2006 | Steinbroner | |
| 2008/0102345 A1* | 5/2008 | Andreas-Schott | H01M 8/2475 429/511 |
| 2008/0311457 A1* | 12/2008 | Andreas-Schott | H01M 8/2483 429/513 |

(Continued)

FOREIGN PATENT DOCUMENTS

| DE | 10 2004 027 694 A1 | 8/2005 |
|---|---|---|
| DE | 10 2008 026 858 A1 | 12/2008 |

(Continued)

*Primary Examiner* — Muhammad S Siddiquee
(74) *Attorney, Agent, or Firm* — Seed IP Law Group LLP

(57) ABSTRACT

A fuel cell stack is provided comprising a first end plate and a second end plate between which a plurality of fuel cells is arranged. At least one tensioning or tensile element is tensioned in the stack direction between the end plates. Inlet and outlet ports for operating resources are arranged in first end areas of the first end plates and in second end areas of the second end plates. At least one additional elastic tensioning element is tensioned between first end areas and/or second end areas of the end plates.

10 Claims, 4 Drawing Sheets

(56) References Cited

U.S. PATENT DOCUMENTS

| | | | | |
|---|---|---|---|---|
| 2009/0029232 A1* | 1/2009 | Petty | ............ | H01M 8/248 |
| | | | | 29/592.1 |
| 2009/0280359 A1 | 11/2009 | Bogumil et al. | | |
| 2011/0217617 A1* | 9/2011 | Andreas-Schott | .... | H01M 8/248 |
| | | | | 429/465 |
| 2011/0244355 A1* | 10/2011 | Skala | ............ | H01M 8/2475 |
| | | | | 429/468 |
| 2011/0294030 A1* | 12/2011 | Yamamoto | ............ | H01M 8/247 |
| | | | | 429/465 |

FOREIGN PATENT DOCUMENTS

| | | |
|---|---|---|
| DE | 10 2010 007 979 A1 | 8/2011 |
| DE | 10 2010 007 981 A1 | 8/2011 |
| DE | 10 2012 000 266 A1 | 7/2013 |
| DE | 11 2014 001 941 T5 | 1/2016 |
| DE | 10 2016 205 282 B3 | 8/2017 |
| EP | 1 753 065 A1 | 2/2007 |
| EP | 1 870 952 A2 | 12/2007 |
| FR | 2 865 853 A1 | 8/2005 |
| WO | 2012/065890 A1 | 5/2012 |

* cited by examiner (A) (B)

FUEL CELL STACK

BACKGROUND

Technical Field

The disclosure relates to fuel cells and vehicles comprising fuel cells.

Description of the Related Art

Fuel cells use the chemical conversion of a fuel with oxygen to water for the creation of electrical energy. For this purpose, fuel cells have a membrane electrode assembly (MEA) with a membrane electrode unit.

The membrane electrode unit is formed by a proton exchange membrane, PEM, upon which catalytic electrodes are arranged on both sides. In this manner, the membrane separates the anode chamber assigned to the anode and the cathode chamber assigned to the cathode from one another and electrically insulates the same. Gas diffusion layers can be arranged on the sides of the electrodes not facing the membrane.

During operation of the fuel cells, a hydrogen-containing fuel is supplied to the anode, upon which an electrochemical oxidation from $H_2$ to $H^+$ occurs with release of electrons. A water-bound or anhydrous transport of the $H^+$ protons from the anode chamber to the cathode chamber occurs via the electrolytic membrane. The electrons made available on the anode are supplied via an electrical line of the cathode.

The cathode is provided with an oxygen-containing operating medium, such that a reduction from $O_2$ to $O_2^-$ takes place there upon uptake of the electrons. These oxygen anions react in the cathode chamber with the protons transported through the membrane, with formation of water.

A fuel cell stack is generally formed by a plurality of MEAs which are arranged in a stack in a stack direction, the electrical power of which is added up. Bipolar plates, which ensure a supply of reactants and coolant to the individual MEAs, and which act as an electrically conductive contact with the membrane electrode assemblies, are generally arranged between the membrane electrode assemblies.

Seals are arranged between the membrane electrode units and the bipolar plates, so as to seal off the anode and cathode chambers from the outside and to prevent the outflow of the operating medium from the stack. These seals are provided on the membrane electrode units, the bipolar plates, or on both of these components.

For permanent sealing of the stack, and to ensure the electrical contact between the bipolar plates and the membrane electrode assemblies, the fuel cell stack is pressed prior to being put into operation. Furthermore, tensile elements are used to also press the fuel cell stack during operation.

Various tensioning elements are known from the state of the art. For example, two end plates arranged at the ends of the fuel cell stack can be connected by means of tensile elements. The fuel cell stack is pressed together through the introduction of tensile forces, via the tensile elements, to the end plates. Threaded rods, tension rods, chains, or the like can, for example, be used as tensile elements.

The use of stretched strips or band-shaped elastic tensioning elements, which are either connected with the end plates or at least partially run around a cross-section (in the stack direction), is also known.

As regards the design and fastening options of such tensioning elements, reference is made to EP 1 870 952 A2, DE 10 2012 000 266 A1, WO 2012/065890 A1 and DE 11 2014 001 941 T5, the contents of which are hereby referred to in full.

It is possible, in particular in the active areas of the fuel cell stack or alternatively of the MEAS, that there are operationally related variations in height, which can, for example, vary with the temperature and moisture content of the fuel cell stack. It is also said that the stack breathes. In the case of elastic tensioning elements, it is possible that the elasticity of this tensioning element can decrease over time. In particular, in the case of metallic tensioning elements which run around the fuel cell stack in a ring shape and thereby have multiple obvious kinks, this leads to the elongation of the tensioning element, in particular in the area of these kinks.

No matter the variations in height of the fuel cell stack and the aging of the tensioning element, a sufficient compression of the stack must always be ensured, in particular to guarantee the sealing effect of the seals that are employed. Means, with which will be attempted to also permanently ensure the compression of a fuel cell stack, are already known from the state of the art.

DE 10 2010 007 979 A1 discloses a fuel cell stack with fuel cells arranged between two end plates and at least one tensioning means, attached to the end plate, to exert tensile force. A friction-reducing means of deflection is arranged between the tensioning means and at least one of the end plates. A variation in height of the stack should be compensated by a compressed spring element arranged between one end plate and one compression plate.

According to this state of the art, tension spikes based on the expansion of the stack should be avoided by means of elastic elements. An initial over-tensioning of the elastic elements should even be able to partially avoid a variation in height of the stack. The elastic elements are however themselves subject to aging and therefore this passive option for the adjustment of the compression force is, to this extent, disadvantageous.

In the case of known solutions with compressed spring elements arranged between the end plates and other stack components, recesses can be provided in the end plates to receive the spring elements. Additional installation space in the fuel cell stack is required for this purpose, furthermore, the recesses increase the tendency of the end plates to deflect or be damaged under the action of compressive or tensile forces.

A further disadvantage of known solutions is that they often cannot guarantee uniform tensioning of the entire end plates. For example, known tensioning elements often cannot be arranged in the area of inlet or outlet ports of the operating resources without blocking them. An example of this is disclosed in US 2006/0093890 A1. This leads to a disadvantageous bending of the end plate edges.

BRIEF SUMMARY

Embodiments of the invention are thus based on the task of overcoming the disadvantages of the state of the art and providing a solution for the most uniform compression of fuel cell stacks which can be integrated into existing fuel cell stacks in a space-saving manner.

This task is solved by a fuel cell stack with a first end plate and a second end plate and a plurality of fuel cells arranged in the stack direction between the two end plates. Furthermore, the fuel cell stack has at least one elastic tensile or tensioning element stretched between the end plates in the stack direction.

This at least one first tensile or tensioning element may be a threaded rod, tie rod, chain or similar. The first tensile or tensioning element may be a tensioned strip or band-shaped elastic tensioning element, which is either connected to the end plates or at least partially runs around the stack in at least one cross-section (in the stack direction). In other words, the first tensile or tensioning element is an ordinary, state-of-the-art component which is already regularly used for compressing fuel cell stacks.

In the first end areas of the first end plate and/or in the second end areas of the second end plate there are inlet and outlet ports for operating resources. The end areas are always edge areas of the end plates, which means that they always include at least one edge area of the end plate. Each end plate may have two end areas, which are located at or encompass edge areas lying opposite to one another. For example, rectangular end plates always have two pairs of opposite edge areas. The end areas may then be arranged at the pair of shorter edge areas.

The inlet and outlet ports may be for inlet and outlet ports for an anode operating resource, a cathode operating resource and a coolant. For example, a first end plate has inlet and outlet ports, whereas a second end plate has no such ports at all. Alternatively, a first end plate has only inlet ports and a second end plate has only outlet ports. Similarly, a first end plate may have first inlet ports, for example, for anode and/or cathode operating resources, and the second end plate may have second inlet ports, for example, for a coolant. The arrangement of the inlet and outlet ports in the end plates depends largely on the flow paths within the fuel cell stack and the arrangement of peripheral components, for example a coolant tank.

At least one (second) elastic tensioning element is tensioned between at least one first and at least one second end area of the end plates. The at least one (second) elastic tensioning element is herein different from the at least one (first) tensioning element and is arranged exclusively in end areas of the end plates. A fuel cell stack, which has first tensile or tensioning elements for tensioning the entire stack, has additional second elastic tensioning elements for tensioning the end areas of the end plates.

The fuel cell stack allows for a targeting tensioning of the end areas of end plates with outlet ports for the operating resource by using first tensile or tensioning elements and second tensioning elements. This prevents bending of the end plates in the end areas, damage to the end areas due to excessive tensile forces or blocking of the inlet and outlet ports.

According to an embodiment of the fuel cell stack, a tensile stress exerted by a tensioned (first) tensile or tensioning element differs from a tensile stress exerted by a tensioned (second) elastic tensioning element. In particular, the tensile stress exerted by a second elastic tensioning element is lower than the tensile stress exerted by a first tensile or tensioning element. In this way the bending of the end plates and excessive tensioning of the end areas is prevented. The elastic tensioning element may be tensioned in a range according to Hooke's law, as well in the stack direction (S) of the fuel cell stack.

The at least one (second) tensioning element may be designed as a band or strip-shaped flexible and/or elastic tensioning element, as is, for example, known from EP 1 870 952 A2. The elastic tensioning element may consist of an elastic plastic, an elastic polymer (i.e., nylon) or an elastic metal, and under standard conditions has a modulus of elasticity >0.5 GPa, such as >5 GPa along the tensioning direction.

In an embodiment of the fuel cell stack, the end areas have first edge areas and second edge areas perpendicular to the first edge areas. In other words, the end plates have a flat extending rectangular shape. The at least one elastic tensioning element is tensioned between first edge areas and/or between second edge areas. In this manner, this embodiment allows the stack to be tensioned along the entire circumference of the end plates. The end areas may completely show a first edge area of the end plates and only partially show the further edge areas of the end plates.

In the case of rectangular end plates, at least one pair of the first and second edge areas, usually the pair of shorter edge areas, is not tensioned with the first tensile or tensioning elements. By fastening the elastic second tensioning elements to the first and/or second edge areas, that is to say, if necessary also to the pair of shorter edge areas, the fuel cell stack is tensioned much more uniformly and a bending of the end areas of the end plates is prevented in a particularly effective manner.

The at least one (second) elastic tensioning element may not be closed. In other words, it does not run around a cross-section of the fuel cell stack, unlike tensioning elements that are closed in a ring shape. In this manner, a blockage of inlet and outlet ports is avoided in a particularly effective manner.

The elastic tensioning element may be firmly bonded and/or frictionally and/or positively fixed and/or fixed by means of at least one means of tensioning to at least one end plate. In order to ensure easy disassembly of the fuel cell stack, the elastic tensioning element may be detachably fixed to at least one end plate of the stack.

The elastic (second) tensioning element may be engaged into the end plate. For this purpose, the end plate may have at least one hook for engaging the elastic tensioning element on one of its side faces or on its outwardly-facing surface in the direction of the stack. Alternatively, the elastic tensioning element has at least one engagement opening for engagement on one engaging hook.

Likewise, the at least one (first) tensile or tensioning element stretches, at least substantially, around a circumference of the fuel cell stack in a cross-section in the stack direction. In this case, a tensile or tensioning element is fixed at least at one end area to another end area of the same, or to another tensile or tensioning element, or to another tensioning element. The tensile or tensioning element may be formed as a closed ring shape.

The end area of the at least one (first) tensile or tensioning element may be connected positively to another end area of the same tensile or tensioning element, for example, by a crimp connection. One end area of the at least one tensile or tensioning element may be fixed to another end area of the same or another tensile or tensioning element by means of a fastening device. An end section of the at least one tensile or tensioning element may be welded to another end section of the same or another tensile or tensioning element.

In an embodiment, the fuel cell stack has at least one rotatable mounting shaft which is arranged along an edge area of the first end area and/or the second end area. The mounting shaft may be integrated into the respective edge area and may be rotatably mounted in or on this edge area. According to this embodiment, an end section of at least one elastic tensioning element is fixed to the mounting shaft, such as firmly bonded and/or frictionally and/or positively fixed, in order to prevent relative movements between the end section and the mounting shaft.

The edge section of an end plate thereby designates a transition from a first, outwardly facing surface of the end plate and a second surface of the end plate perpendicular to the first surface. The second surface may extend along the stacking direction of the fuel cell stack or has a normal vector perpendicular to the stacking direction.

The at least one mounting shaft may pass through the end plate in sections in the area of an edge area of an end plate. In the case of a cylindrical mounting shaft, the end plate in this embodiment may have a cylindrical bore. It is in this manner that a simple rotatable mounting of the mounting shaft is achieved.

Furthermore, the end plate in this embodiment may have recesses or set-backs of the edge area where the mounting shaft is exposed. The at least one elastic tensioning element may be fastened to the mounting shaft in the area of the recess. This makes it easier to wind it onto the mounting shaft.

By fixing the end section of at least one (second) elastic tensioning element to the mounting shaft, the tensile stress of the at least one elastic tensioning element can be adjusted by rotating the mounting shaft. The fuel cell stack thus allows an exact retensioning of the at least one elastic tensioning element.

A second end section of the at least one elastic tensioning element may also be fixed to the fuel cell stack. The second end section is thereby different from the first end section and each elastic tensioning element has a first and a second end section.

The second end section may be fixed to another mounting shaft. In this manner, the elastic tensioning element can be retensioned on both sides and thus in a particular uniform and precise manner. The second end section may also be firmly fixed to any other section of the fuel cell stack, in particular to an end section of an end plate. This is a particularly simple embodiment.

The tensile stress may be adjusted by winding the elastic tensioning element onto the mounting shaft by rotating the mounting shaft in a first direction of rotation. In this manner the at least one elastic tensioning element is effectively shortened between the first and second end plate and thereby increases the tensile force generated by it. The elastic tensioning element can be unwound from the mounting shaft by rotating the mounting shaft in a second, opposite direction of rotation. This effectively lengthens the at least one elastic tensioning element between the first and second end plate, thereby reducing the tensile force generated by it. This means that compression can be adjusted with particular accuracy, especially in the area of the end areas of the end plates.

In an embodiment of the fuel cell stack, the at least one mounting shaft has a longitudinally extended radial groove. This radial groove may extend parallel to an axis of rotation of the mounting shaft. The radial groove may be designed to accommodate the end section of the at least one elastic tensioning element. In other words, the end section of the elastic tensioning element is inserted into the radial groove and fixed there, for example, by means of a firmly bonded and/or frictionally and/or positively locked connection.

In an embodiment of the fuel cell stack, the rotatable mounting shaft is connected to the fuel cell stack, in particular to an end area of one of the end plates, via at least one tensioned torsion spring. In other words, the torsion spring is fixed to the mounting shaft and is additionally fixed to the fuel cell stack, in particular to an end plate. A first end of the torsion spring, for example, a first end of a wire wound into a spring, may be fixed to the mounting shaft and a second end of the torsion spring, for example a second end of the wire wound into a spring, is fixed to the fuel cell stack. In this way, the spring tension or alternatively the torque of the tensioned torsion spring is transmitted to the rotatably mounted mounting shaft. The torsion spring may be connected to the mounting shaft in such a way that a torque exerted by the spring opposes a tensile stress exerted by the elastic tensioning element.

The arrangement of the tensioned torsion spring between the mounting shaft and the fuel cell stack, in particular in the end area of an end plate, is advantageous in that a directional torque opposing the tensile stress of the elastic tensioning element is transmitted to the mounting shaft. When the tensile stress of the elastic tensioning element decreases, for example, due to age-related elongation of the elastic tensioning element, the spring thus leads to retensioning of the elastic tensioning element by means of the torque of the torsion spring.

In accordance with this embodiment, a compression of the fuel cell stack, in particular of the end areas of the end plates tensioned by means of elastic tensioning elements, is reliably ensured even over an extended period of time. It is particularly advantageous if an automatic retensioning of an elongated elastic tensioning element takes pace by winding the elastic tensioning element onto the mounting shaft by means of the potential energy stored in at least one torsion spring. Thereby, the winding up only takes place when the tension of the elastic tensioning element falls below the torque of the torsion spring.

The at least one elastic (second) tensioning element, such as each elastic tensioning element, may also be tensioned by a plurality of torsion springs connected to the at least one mounting shaft. For this purpose, the at least one elastic tensioning element is fixed to a mounting shaft and the plurality of tensioned torsion springs is fixed to this mounting shaft and the fuel cell stack. In this manner, the spring forces applied by the plurality of torsion springs add up to a total force.

In another embodiment, the at least one torsion spring is a coil spring, such as a spirally wound coil spring made of wire or spring steel. Another type of torsion spring is a torsion rod spring or a torsion bar. Furthermore, such a torsion rod spring may be designed integral to the mounting shaft, for example, as a section of the torsion rod spring connected to the fuel cell stack, such as to an end plate. The torsion spring may also be designed as a hollow machined spring. The torsion spring may be machined from a hollow cylinder made of spring steel. Such hollow machined springs allow a particularly precise setting of the spring force, especially over extended periods of time.

The connection between torsion spring and mounting shaft or torsion spring and fuel cell stack can be realized in many different ways. For example, the torsion spring is flanged to the fuel cell stack, such as to an end plate. The mounting shaft can also have a projecting flange area for fixing the torsion spring. Alternatively, the torsion spring is permanently connected to the mounting shaft, for example, by welding. Furthermore, the torsion spring may be connected to the fuel cell stack and/or the mounting shaft by means of a positive locking, for example, by means of bayonet connection elements. Connecting elements of this type may be designed to be self-locking, while specially taking into account the direction of action of the spring force of the torsion spring.

In an embodiment, the fuel cell stack also has at least one electric motor that is designed to drive the at least one mounting shaft by an electric motor. In other words, the at least one mounting shaft can be rotated by means of an electric motor. The motor may allow the mounting shaft to rotate in a first direction of rotation, such as in a first direction and in an opposite second direction of rotation. This embodiment allows an automatic retensioning of the at least one torsion spring that is firmly connected to the mounting shaft. In this manner, a loss of tension due to age can be counteracted by the torsion springs themselves. Furthermore, the electric motor directly enables the retensioning of the (second) elastic tensioning element.

The fuel cell stack may have at least one sensor which is designed to detect a tensile force exerted by at least one tensioning element and/or the spring force exerted by at least one torsion spring. The sensor may detect a tensile force exerted by a specific elastic tensioning element and/or the spring force exerted by a specific torsion spring. For example, such a sensor is designed as a strain gauge. A sensor, in particular a strain gauge, may be arranged on each elastic tensioning element.

The use of such sensors in the fuel cell stack allows the measurement of the change in length of the elastic tensioning element. A tensile force or alternatively a change in tensile force of the respective tensioning element may be determined on the basis of the change in length of the tensioning element. This allows conclusions to be drawn that the elastic tensioning element needs to be retensioned or one or more torsion springs are no longer sufficiently tensioned to compensate for the loss of tensile stress. A long-term compression of the end areas of the end plates can be ensured by retensioning of the elastic tensioning elements and/or of the springs.

Furthermore, the fuel cell stack may have at least one control unit that is connected to the at least one sensor and is designed to operate the at least one electric motor. The control unit may be designed to receive a sensor signal from the at least one sensor. Furthermore, the control unit is designed to output a control signal to the at least one electric motor. The embodiment enables an automated retensioning of the elastic tensioning element and/or of the torsion springs on the basis of sensor values for the tensile force of the elastic tensioning elements and/or based on sensor values for the tensile force of the torsion springs.

In an embodiment, the fuel cell stack has a plurality of (second) elastic tensioning elements and a plurality of mounting shafts. Each mounting shaft is thereby connected with one or more tensioned torsion springs to the fuel cell stack, in particular to one end area of one end plate and one or more elastic tensioning elements are fixed to each mounting shaft.

Furthermore, the fuel cell stack may have a plurality of electric motors designed to drive at least one of the mounting shafts.

This embodiment allows tensile stress verification of individual groups of elastic tensioning elements or even single elastic tensioning elements. For this, it is essential that different elastic tensioning elements are fixed to different mounting shafts. The mounting shafts may be rotated by a common electric motor. For example, two mounting shafts can be driven by a motor arranged centrally between these shafts. Several tensioning elements may be connected to a common motor in a controllable, frictional locked manner via respective couplings. Furthermore, the fuel cell stack may have a plurality of sensors for the measurement of the tensile stress of the elastic tensioning elements.

Furthermore, the at least one mounting shaft may have at least one ratchet wheel and at least one pawl engaging with the ratchet wheel. The principle of a ratchet may therefore be used to allow the mounting shaft to rotate in one direction only. In this way, the stress on the torsion springs can be relieved of stress and the bearings of the electric motors can be protected. This embodiment can be combined with the use of a single motor for a plurality of mounting shafts.

A further subject matter is a vehicle, in particular an electric-motor-driven vehicle with a fuel cell stack, as described above. The fuel cell stack serves in particular to supply an electric motor of the vehicle.

The various embodiments of the invention mentioned herein can be combined with each other, unless otherwise specified in the individual case.

BRIEF DESCRIPTION OF THE SEVERAL VIEWS OF THE DRAWINGS

Embodiments of the invention will be further explained with reference to the drawings, wherein.

DETAILED DESCRIPTION

Figure 1:
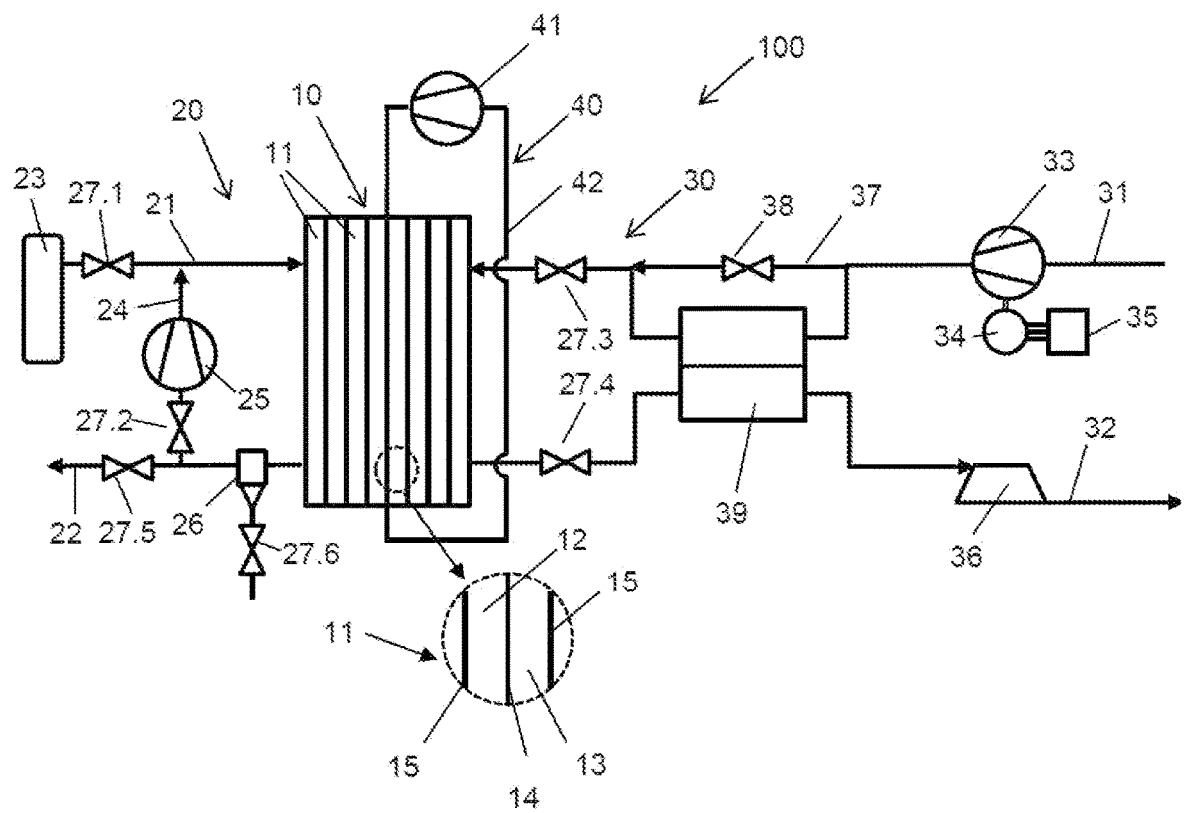
FIG. 1 shows a schematic view of a fuel cell system.

FIG. 1 shows a state-of-the-art fuel cell system designated 100. The fuel cell system 100 is part of a vehicle that is not further represented, in particular, an electric vehicle, which has an electric traction motor that is supplied with electrical energy by the fuel cell system 100.

The fuel cell system 100 comprises, as the core component, a fuel cell stack 10, which has a plurality of individual cells 11 arranged in stack form, which are formed by alternately stacked membrane electrode assemblies (MEA) 14 and bipolar plates 15 (see detailed section). Each individual cell 11 thus comprises a MEA 14 with an ion-conductive polymer electrolyte membrane (not shown in detail here) as well as catalytic electrodes arranged on both sides thereof. These electrodes catalyze the respective partial reaction of the conversion of the fuel. The anode and cathode electrodes are designed as a coating on the membrane and have a catalytic material, for example, platinum, which is supported on an electrically conductive carrier material with a large specific surface area, for example, a carbon-based material.

As shown in the detailed illustration in FIG. 1, an anode chamber 12 is formed between a bipolar plate 15 and the anode, and the cathode chamber 13 is formed between the cathode and the next bipolar plate 15. The bipolar plates 15 are used to feed the operating resources into the anode and cathode chambers 12, 13 and moreover establish the electrical connection between the individual fuel cells 11. Optionally, gas diffusion layers can be arranged between the membrane electrode assemblies 14 and the bipolar plates 15.

In order to supply the fuel cell stack 10 with operating resources, the fuel cell system 100 has an anode supply 20 on the one side and a cathode supply 30 on the other side.

The anode supply 20 of the fuel cell system 100 shown in FIG. 1 comprises an anode supply path 21, which serves to supply an anode operating resource (the fuel), for example, hydrogen, to the anode chambers 12 of the fuel cell stack 10. For this purpose, the anode supply path 21 connects a fuel storage 23 with an anode inlet of the fuel cell stack 10. The setting of the feed pressure of the anode operating resource into the anode chambers 12 of the fuel cell stack 10 is carried out via a metering valve 27.1. The anode supply 20 further comprises an anode off-gas path 22, which discharges the anode off-gas from the anode chambers 12 via an anode outlet of the fuel cell stack 10.

In addition, the anode supply 20 of the fuel cell system 100 shown in FIG. 1 has a recirculation line 24 which connects the anode off-gas path 22 with the anode supply path 21. Recirculation of fuel is common in order to return the fuel that was used overstiochiometrically to the fuel cell stack 10. A recirculation enhancement system 25, such as a recirculation blower, as well as a flap valve 27.2 may be arranged in the recirculation line 24.

In addition, a water separator 26 is built into the anode supply 22 of the fuel cell system to remove the product water resulting from the fuel cell reaction. A drain of the water separator can be connected to the cathode off-gas line 32, a water tank, or an off-gas system.

The cathode supply 30 of the fuel cell system 100 shown in FIG. 1 includes a cathode supply path 31 which supplies an oxygen-containing cathode operating resource, in particular air drawn from the environment, to the cathode chambers 13 of the fuel cell stack 10. The cathode supply 30 further comprises a cathode off-gas path 32, which discharges the cathode off-gas (in particular, the exhaust air) from the cathode chambers 13 of the fuel cell stack 10 and, if necessary, feeds it to an off-gas system not shown.

A compressor 33 is arranged in the cathode supply path 31 for conveying and compressing the cathode operating resource. In the implementation example shown, the compressor 33 is designed as a mainly electric-motor-driven compressor 33, which is driven by an electric motor 34 equipped with corresponding power electronics 35.

The fuel cell system 100 shown in FIG. 1 moreover has a humidifier module 39 arranged upstream of the compressor 33 in the cathode supply line 31. On the one hand, the humidifier module 39 is arranged in the cathode supply path 31 so that the cathode off-gas can flow through it. On the other hand, it is arranged in the cathode off-gas path 32 in such a way that the cathode off-gas can flow through it. A humidifier 39 typically has a plurality of water vapor permeable membranes which are either flat or in the form of hollow fibers. The relatively dry cathode operating gas (air) flows over one side of the membranes and the relatively moist cathode off-gas (off-gas) flows over the other side. Driven by the higher partial pressure of water vapor in the cathode off-gas, water vapor is transferred across the membrane into the cathode operating gas, which is humidified in this way.

The fuel cell system 100 moreover has a humidifier bypass 37 connecting together the cathode supply line upstream and downstream of the humidifier 39 with a flap valve arranged therein as a bypass control means 38. Furthermore, flap valves 27.3 and 27.4 are arranged upstream of the fuel cell stack 10 in the anode supply line 31 and downstream of the fuel cell stack 10 in the anode off-gas line 32.

Various other details of the anode and cathode supply lines 20, 30 are not shown in FIG. 1 for reasons of clarity. For example, the anode off-gas line 22 can open into the cathode off-gas line 32, so that the anode off-gas and cathode off-gas are discharged via a common off-gas system.

Figure 2:
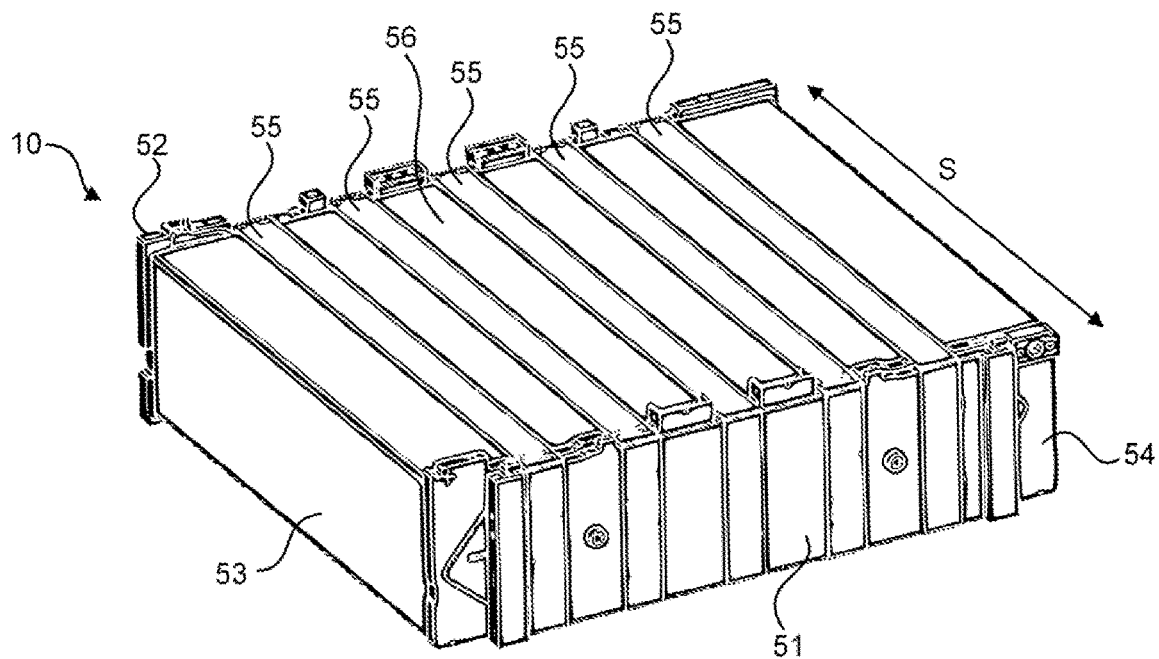
FIG. 2 shows a fuel cell stack with a plurality of the tensioning elements compressing the stack.

FIG. 2 shows a view of a fuel cell stack according to the state of the art, which can be arranged in the fuel cell system 100 of FIG. 1. The fuel cell stack 10 has a plurality of fuel cells stacked flat on top of each other in the stack direction S.

In the stack direction S, the fuel cell stack 10 is bounded by a first end plate 51 and a thereto opposite second end plate 52. In a first direction that is transverse to the stack direction S, the fuel cell stack 10 is bounded by side panels 53, 54. In a second direction that is transverse to the first direction and transverse to the stack direction S, the fuel cell stack 10 is bounded by side panel 56.

The fuel cell stack 10 shown in FIG. 2 is compressed by a plurality of five tensioning elements 55 total. Each tensioning element 55 completely runs around a cross-section of the fuel cell stack 10, stretching over the end plates 51, 52 and the side panel 56. The tensioning elements 55 thereby rest against the end plates 51, 52 and the side panel 56. Each tensioning element 55 is welded to itself in an area of the first end plate 51. To compress the fuel cell stack 10, the tensioning elements 55 are welded to themselves while the tensioning element 55 is under tensile stress.

Figure 3:
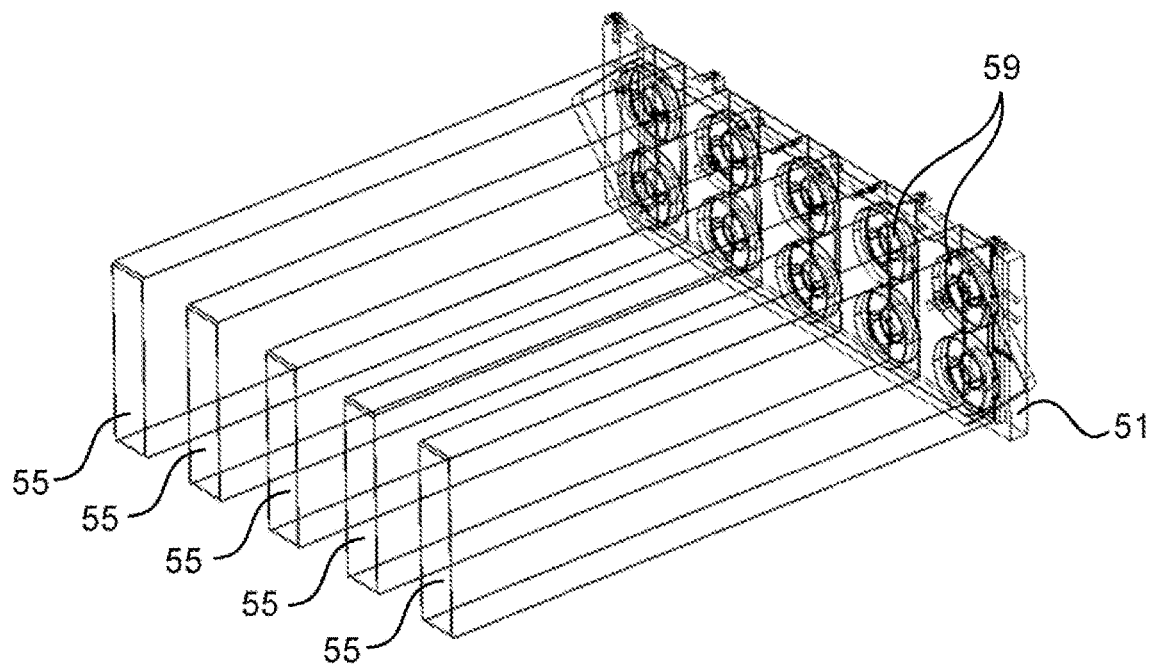
FIG. 3 shows a detailed view of the fuel cell stack of FIG. 2.

It is not possible to retension the tensioning elements 55 in the case of the fuel cell stack 10 as shown in FIG. 2. Instead, as shown in FIG. 3, a plurality of compression springs 59 are arranged between the end plate 51 and a compression plate (not shown) of the fuel cell stack 10 of FIG. 2. If the length of the tensioning elements 55 increases due to aging, this should be compensated by the compression springs 59. The springs 59 are arranged in inwardly pointing recesses in the end plate 51. This means that either additional installation space is required for the springs 59, for example by making the end plate 51 thicker, or the end plate 51 must be thinner in the area of the recesses and is therefore less stable. Both variants lead to specific disadvantages of the respective design.

Figure 4:
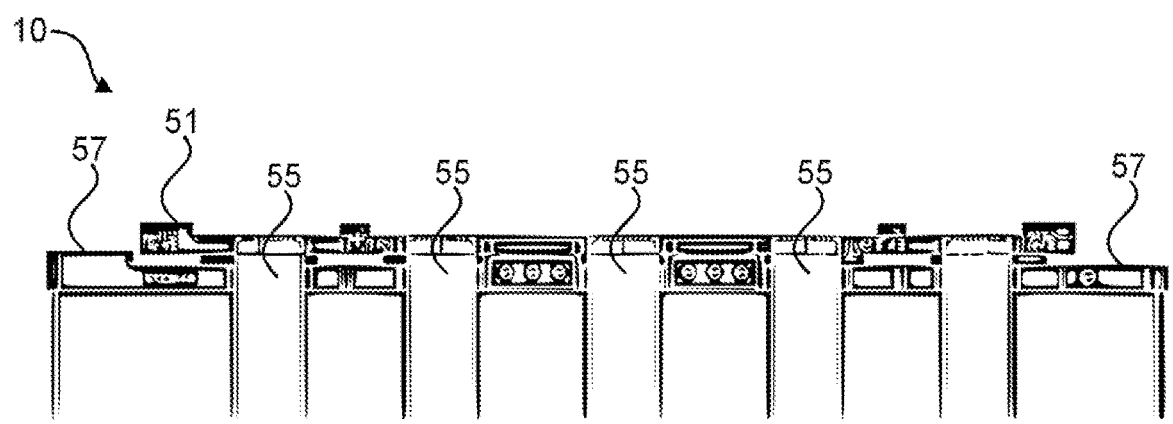
FIG. 4 shows a detailed view of the fuel cell stack of FIG. 2.

As further shown in FIG. 4, due to the use of circumferential tensioning elements 55, it is not possible to tension the end plate 51 in the inlet/outlet areas 57 of the fuel cell stack 10, areas in which the operating resource are supplied or discharged. This results in a disadvantageous bending of the end plates 51 in their first end areas 57 in the state of the art.

Figure 5:
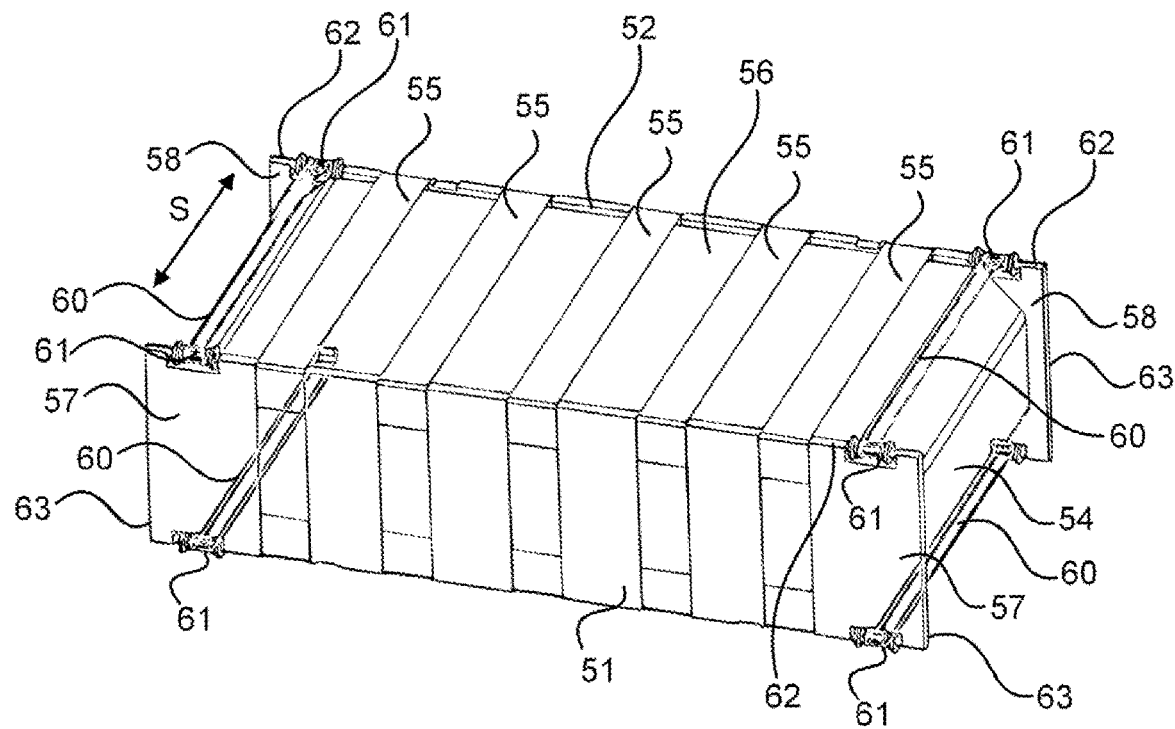
FIG. 5 shows a fuel cell stack according to an embodiment.
Figure 6:
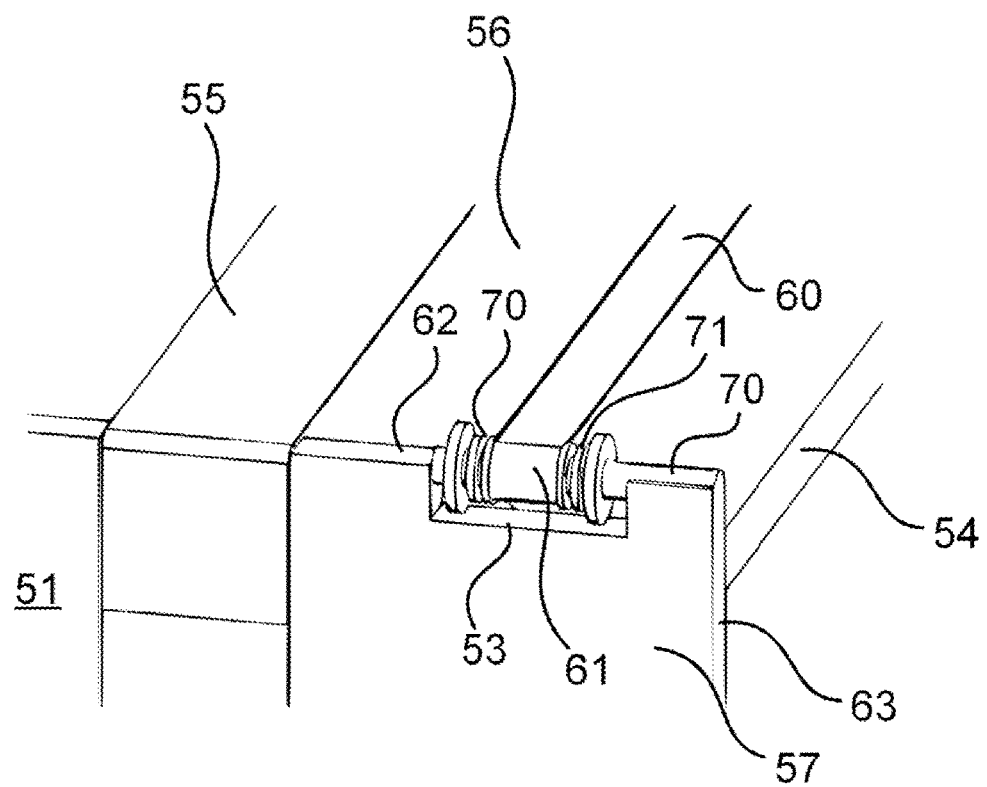
FIG. 6 shows a detailed view of the fuel cell stack of FIG. 5.

FIG. 5 shows a schematic view of a fuel cell stack 10 according to a first embodiment. FIG. 6 shows a detailed view of this fuel cell stack 10 which is described below when it differs from the fuel cell stack shown in FIG. 2 and FIG. 3.

The fuel cell stack 10 has a first end plate 51 as well as a second end plate 52 laying opposite. The first end plate 51 has first end areas 57 with inlet and outlet ports located therein and the second end plate 52 has second end areas 58 with inlet and outlet ports therein. The end plates 51, 52 respectively have a rectangular shape with a pair of short and a pair of long side edges. The first and second end sections 57, 58 comprise the short side edges completely and the long side edges only partially.

The first and second end plates 51, 52 are tensioned along their long side edges by a plurality of first tensioning elements 55. The tensioning elements 55 thereby run completely around the cross-section of the fuel cell stack 10. The tensioning elements 55 are thus closed in a circle and welded to each other in the area of the first end plate 51. The first tensioning elements 55 thus correspond to the tensioning elements already explained with reference to FIG. 2 which are known from the state of the art.

In addition, the fuel cell stack 10 has second elastic tensioning elements 60, which are each tensioned between a first end area 57 of the first end plate 51 and a second end area 58 of the second end plate 52. Each end section 57, 58 has a first edge section 62, which is part of a long side edge of the end plate 51, 52. Moreover, each end section 57, 58 has a second edge section 63 that runs perpendicular to the first edge section, which comprises a short side edge of the end plate 51, 52. In FIG. 5, the elastic tensioning elements 60 are tensioned between the first edge areas 62 of the end plates 51, 52.

As shown in detail in FIG. 6, a mounting shaft 70 is respectively rotatably mounted in the area of the first edge area 62 of the end plates 51, 52. For this purpose, the end plates 51, 52 each have recesses 53 in the first edge areas 62 where the respective mounting shaft 60 is exposed. The end sections 61 of each elastic tensioning element 60 are fixed to the mounting shafts 70, wherein one end section 61 is respectively fixed to each mounting shaft 70. By fixing, which is to say firmly bonding and/or frictionally and/or positively fixing the end sections 61 of the tensioning elements 60 to the mounting shafts 70 in the area of recesses 53 of the end plates 51, 52, the tensioning elements 60 can be wound onto the mounting shafts 70 by rotating the same and thereby be retensioned without the end plates 51, 52 hindering this winding.

Within the recesses 53, torsion springs 71 are furthermore fixed to both the mounting shaft 70 and to the respective end plates 51, 52. In particular, the torsion springs 70 are welded to the respective mounting shaft 70 and fixed by means of a flange (not shown) to an inward facing wall of the respective recess 53. Each end section 61 of each tensioning element 60 in each recess 53 is surrounded by two torsion springs 71. Thus, one end section 61 of a tensioning element 60 and two torsion springs 71 are arranged on each section of a mounting shaft 70 exposed within a recess 53.

The torsion springs 71 are tensioned in such a way that a force exerted by the torsion springs 71 on the mounting shaft 70, or alternatively a torque exerted on the mounting shaft is opposed by a force or alternatively torque exerted by the tensioning elements 60 on the mounting shaft 70. In particular, a tensioning element 60 that is wound around the mounting shaft 71 at least one time transmits a torque to the mounting shaft 71.

Due to the rotatable mounting of the mounting shafts 70, there is always a kinematic equilibrium between the torsion springs 71 and the tensioning elements 60. Thus, a decrease in the tensile stress of the tensioning elements 60, due, for example, to a lengthening caused by aging, is compensated by winding the tensioning elements 60 onto the mounting shafts 70, which is brought about by the torque of the torsion springs 71.

With the fuel cell stack 10, a targeted compression of the fuel cell stack 10 in the end areas 57, 58 of the end plates 51, 52, by means of the tensioning elements 60, the mounting shafts 70 and the torsion springs 71, this independent of the compression by the tensioning elements 60, is permanently guaranteed. The mounting shaft 71 thereby enables a retensioning of the tensioning elements 70 and the torsion springs 71 ensure a permanent maintenance of a specific tension of the tensioning elements 70.

The mounting shafts 70 may each have a longitudinal radial groove (not shown). In other words, a radial groove is provided in the mounting shaft 70 along a longitudinal extension of the mounting shaft 70. The radial groove is designed to accommodate an end section 61 of one of the tensioning elements 60.

The end section 61 is then fixed in the radial groove, for example, frictionally by means of an adhesive. It is also conceivable that the end section 61 has a terminal thickening that corresponds to an internal expansion of the radial groove. The end section 61 of the tensioning element 60 can then be inserted laterally into the mounting shaft 70, which is to say in the direction of the longitudinal expansion of the shaft 70, and would thus be fixed positively in the radial groove. It is also conceivable that the radial groove could be narrowed after the end section 61 has been inserted, for example by placing a circlip on the shaft 70. This would result in the end section 61 being frictionally fixed in the shaft 70.

Figure 7:
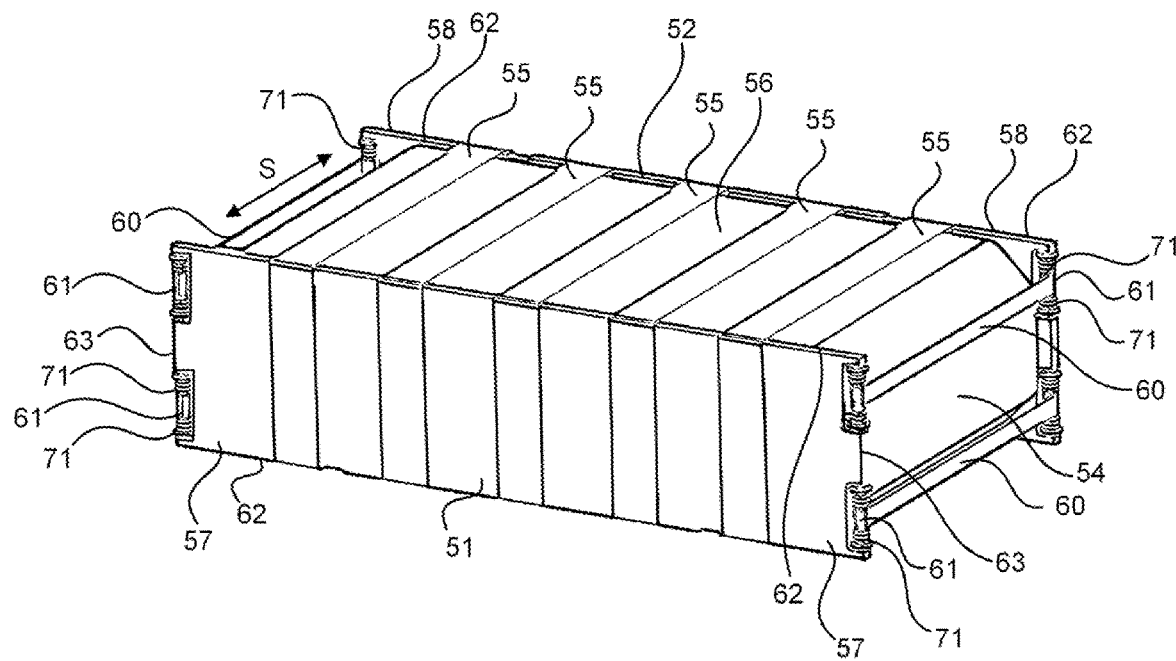
FIG. 7 shows a fuel cell stack according to another embodiment.
Figure 8:
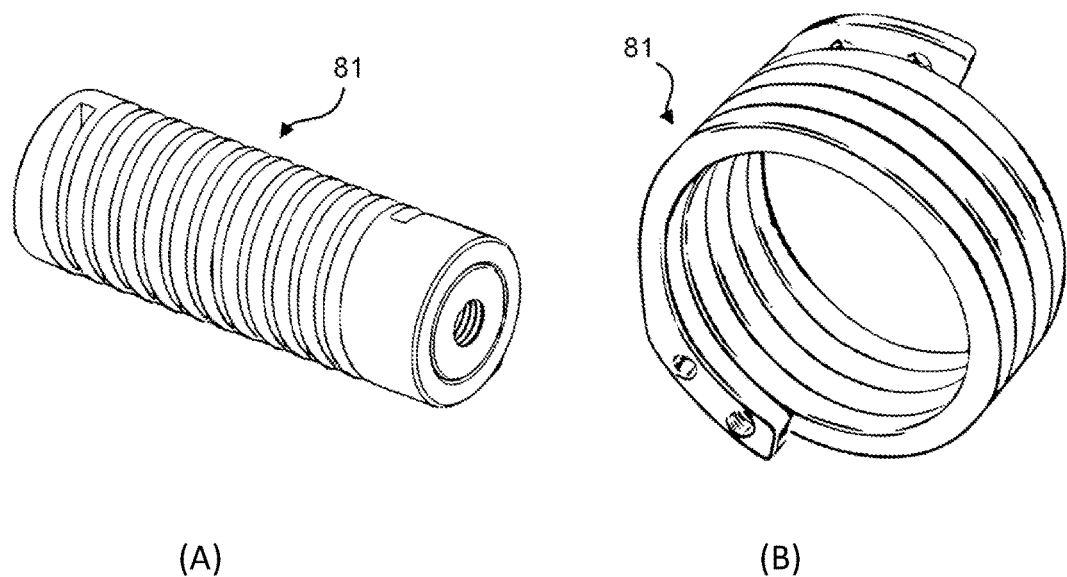
FIG. 8 shows two variants of hollow machined springs.

A fuel cell stack 10 according to another embodiment is shown in FIG. 7. This differs from the first embodiment of FIGS. 4 to 6 in that the elastic tensioning elements 60 are tensioned between second edge areas 63 of the end plates 51, 52. In particular, two elastic tensioning elements 60 are respectively tensioned between a second edge area 63 of a first end area 57 of the first end plate and a second edge area 63 of a second end area 58 of the second end plate 52. This means that a total of four elastic tensioning elements 60, in addition to the five tensile and tensioning circumferential elements 55, are thus tensioned between the first and second end plates 51, 52. Alternatively, only one wide elastic tensioning element 60 could be tensioned between end sections 57, 58 of end plates 51, 52. FIG. 8 shows two embodiments of a torsion spring 80 as hollow machined springs 81. FIG. 8 (A) shows a first torsion spring 80 machined from a hollow cylinder of spring steel. This torsion spring has a female thread with which the torsion spring 80 can be screwed onto a mounting shaft 60, wherein the thread direction brings about a self-locking of the spring 80 on the mounting shaft. In the simplest case, the torsion spring 80 is fixed to the fuel cell stack 10, in particular to an inner wall of the recess 53 of an end plate 51, 52, by means of a frictional connection of the compressed torsion spring 80 to an end plate 51, 52 and a positive connection of a stop lug of the end plate 51, 52 which engages in the recess of the spring 80. FIG. 8 (B) shows a second torsion spring 80 machined from a hollow cylinder made of spring steel. This torsion spring has through holes at both sides at its ends as connecting elements for attachment to the mounting shaft 60 or alternatively to the fuel cell stack 10, in particular an end plate 51, 52. The connecting elements are designed as guides for a safety cotter pin.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:
   one first end plate and one second end plate;
   a plurality of fuel cells arranged between the first and second end plates; and
   at least one first elastic tensile or tensioning element tensioned in the stack direction between the end plates,
   wherein in first end areas of the first end plate and/or in second end areas of the second end plate inlet and outlet ports for operating resources are arranged, and
   wherein at least one second elastic tensile or tensioning element is tensioned between one of the first end areas and one of the second end areas.

2. The fuel cell stack according to claim 1, wherein the end areas have first edge areas and second edge areas which are perpendicular to the first end areas, wherein the at least one second elastic tensile or tensioning element is tensioned between first edge areas and/or second edge areas.

3. The fuel cell stack according to claim 1, wherein a first tensile stress applied by the first elastic tensile or tensioning element differs from a second tensile stress applied by the second elastic tensile or tensioning element.

4. The fuel cell stack according to claim 1, further comprising at least one rotatable mounting shaft arranged along an edge area of a first and/or second end area, wherein an end area of the at least one second elastic tensioning element is fixed to the mounting shaft.

5. The fuel cell stack according to claim 4, wherein a tensile stress of the second elastic tensioning element can be adjusted by rotation of the mounting shaft.

6. The fuel cell stack according to claim 4, wherein the rotatable mounting shaft is connected to the fuel cell stack via at least one tensioned torsion spring.

7. The fuel cell stack according to claim 6, wherein the at least one torsion spring is designed as a coil spring, torsion rod spring, or hollow machined spring.

8. The fuel cell stack according to claim 4, further comprising at least one electric motor designed for electromotive drive of the at least one mounting shaft.

9. The fuel cell stack according to claim 4, wherein the at least one mounting shaft comprises at least one ratchet wheel and at least one pawl engaging with the ratchet wheel.

10. A vehicle with a fuel cell stack according to claim 1.

\* \* \* \* \*